US006993200B2

(12) United States Patent
Tastl et al.

(10) Patent No.: US 6,993,200 B2
(45) Date of Patent: Jan. 31, 2006

(54) SYSTEM AND METHOD FOR EFFECTIVELY RENDERING HIGH DYNAMIC RANGE IMAGES

(75) Inventors: Ingeborg Tastl, Mountain View, CA (US); David Hasler, Lausanne (CH)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 739 days.

(21) Appl. No.: 09/989,288

(22) Filed: Nov. 20, 2001

(65) Prior Publication Data

US 2003/0103677 A1 Jun. 5, 2003

(51) Int. Cl.
*G06K 9/36* (2006.01)
*G06K 9/40* (2006.01)
*G06K 9/00* (2006.01)
*H04N 9/68* (2006.01)

(52) U.S. Cl. .................. 382/240; 382/274; 382/162; 348/234

(58) Field of Classification Search ................ 382/232, 382/254, 274, 162, 166, 167, 132, 260, 263, 382/264, 240, 265; 348/234, 235, 254; 358/1, 358/9, 18, 5, 8; 345/590
See application file for complete search history.

(56) References Cited

U.S. PATENT DOCUMENTS

| | | | | |
|---|---|---|---|---|
| 5,541,028 A | * | 7/1996 | Lee et al. ................. | 430/30 |
| 5,774,599 A | * | 6/1998 | Muka et al. .............. | 382/254 |
| 5,850,357 A | | 12/1998 | Shefer ..................... | 364/825 |
| 6,285,798 B1 | * | 9/2001 | Lee ......................... | 382/260 |
| 6,411,306 B1 | * | 6/2002 | Miller et al. ............. | 345/690 |
| 6,766,064 B1 | * | 7/2004 | Langan et al. ........... | 382/274 |
| 6,778,691 B1 | * | 8/2004 | Barski et al. ............ | 382/132 |
| 2003/0031378 A1 | * | 2/2003 | Langan et al. ........... | 382/274 |
| 2004/0071363 A1 | * | 4/2004 | Kouri et al. ............. | 382/276 |

OTHER PUBLICATIONS

Image Lightness Rescaling Using Sigmoidal Contrast Enhancement Functions, G. Braun, M. Fairchild, in IS & T/SPIE Electronic Imaging 99, Color Imaging: Device Independent Color, Color Hardcopy, and Graphics Arts IV, 1999.
Local Color Correction Using Non-Linear Masking, N. Moroney, in 8$^{th}$ IS&T Color Imaging Conference, Nov. 2000.
A Multiscale Model Of Adaptation And Spatial Vision For Realistic Image Display, S.N. Pattanaik, J.A. Ferwerda, M.D. Fairchild, D.P. Greenberg, in SIGGRAPH, 1998.

* cited by examiner

Primary Examiner—Wenpeng Chen
(74) Attorney, Agent, or Firm—Gregory J. Koerner; Redwood Patent Law

(57) ABSTRACT

A system and method for rendering high dynamic range images includes a rendering manager that divides an original luminance image into a plurality of original subband images. The rendering manager converts the original subband images into original contrast images which are converted into original perceived contrast images. The rendering manager performs a compression procedure upon the original perceived contrast images to produce compressed perceived contrast images. The rendering manager converts the compressed perceived contrast images into compressed contrast images which are converted into compressed subband images. The rendering manager performs a subband combination procedure for combining the compressed subband images together with a lowest-frequency subband image to generate a rendered luminance image. The rendering manager may combines the rendered luminance image with corresponding chrominance information to generate a rendered composite image.

42 Claims, 8 Drawing Sheets

SYSTEM AND METHOD FOR EFFECTIVELY RENDERING HIGH DYNAMIC RANGE IMAGES

BACKGROUND SECTION

1. Field of the Invention

This invention relates generally to techniques for manipulating data, and relates more particularly to a system and method for effectively rendering high dynamic range images.

2. Description of the Background Art

Implementing effective methods for manipulating data is a significant consideration for designers and manufacturers of contemporary electronic devices. However, effectively manipulating data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures and manipulates digital image data may benefit from an effective implementation because of the large amount and complexity of the digital data involved.

Due to growing demands on system resources and substantially increasing data magnitudes, it is apparent that developing new techniques for manipulating data is a matter of concern for related electronic technologies. Therefore, for all the foregoing reasons, developing effective systems for manipulating data remains a significant consideration for designers, manufacturers, and users of contemporary electronic devices.

SUMMARY

In accordance with the present invention, a system and method are disclosed for effectively rendering high dynamic range images. In one embodiment, a rendering manager may initially separate original image data into an original luminance image and chrominance information. Then, the rendering manager may preferably divide the original luminance image into original subband images using any appropriate technique or method.

Next, the rendering manager may preferably generate original contrast images that each correspond to one of the original subband images by utilizing any appropriate means. The rendering manager may then preferably calculate original contrast thresholds that correspond to the original subband images. Finally, the rendering manager may preferably generate original perceived contrast images that each correspond to one of the original contrast images by utilizing any appropriate and effective means.

In accordance with the present invention, the rendering manager may then preferably perform a compression procedure upon the original perceived contrast images to produce corresponding compressed perceived contrast images by utilizing any appropriate techniques to reduce the dynamic range of the original perceived contrast images.

The rendering manager may next preferably calculate display contrast thresholds corresponding to the particular type of display device upon which the rendered image data is ultimately viewed. Then, the rendering manager may preferably generate compressed contrast images corresponding to the compressed perceived contrast images by utilizing any appropriate technique. Next, the rendering manager may preferably generate compressed subband images corresponding to the compressed contrast images by utilizing any effective means.

The rendering manager may then preferably scale the pixel luminance values of a lowest-frequency subband image from the original subband images so that a mean pixel luminance value of the lowest-frequency subband image matches a mean luminance value of the particular type of display device upon which the rendered image data is viewed.

The rendering manager may next preferably perform a subband combination procedure to combine the lowest-frequency subband image with the compressed subband images to thereby produce a single rendered luminance image. In certain embodiments, the rendering manager may preferably begin the subband combination procedure by adding an initial compressed subband image (the next-to-lowest frequency compressed subband image) to the lowest-frequency subband image (upscaled by a factor of 2) to thereby generate a current combined subband image. The rendering manager may then continue the subband combination procedure by sequentially adding each of the remaining compressed subband images to the current combined subband image in an order of ascending subband frequencies to finally produce the rendered luminance image.

Finally, the rendering manager may preferably combine the rendered luminance image with the corresponding chrominance information to generate a rendered composite image. A system user may then access and utilize the rendered composite image in any desired manner. The present invention thus provides an improved system and method for effectively rendering high dynamic range images.

DETAILED DESCRIPTION

The present invention relates to an improvement in data manipulation techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively rendering high dynamic range images, and may include a rendering manager that initially divides an original luminance image into a plurality of original subband images. The rendering manager may then convert the original subband images into original contrast images which may then advantageously be converted into original perceived contrast images.

The rendering manager may then perform a compression procedure upon the original perceived contrast images to produce compressed perceived contrast images. The rendering manager may next convert the compressed perceived contrast images into compressed contrast images which may then be converted into compressed subband images. The rendering manager may finally perform a subband combination procedure for combining the compressed subband images together with a lowest-frequency subband image to thereby generate a rendered luminance image.

Figure 1:
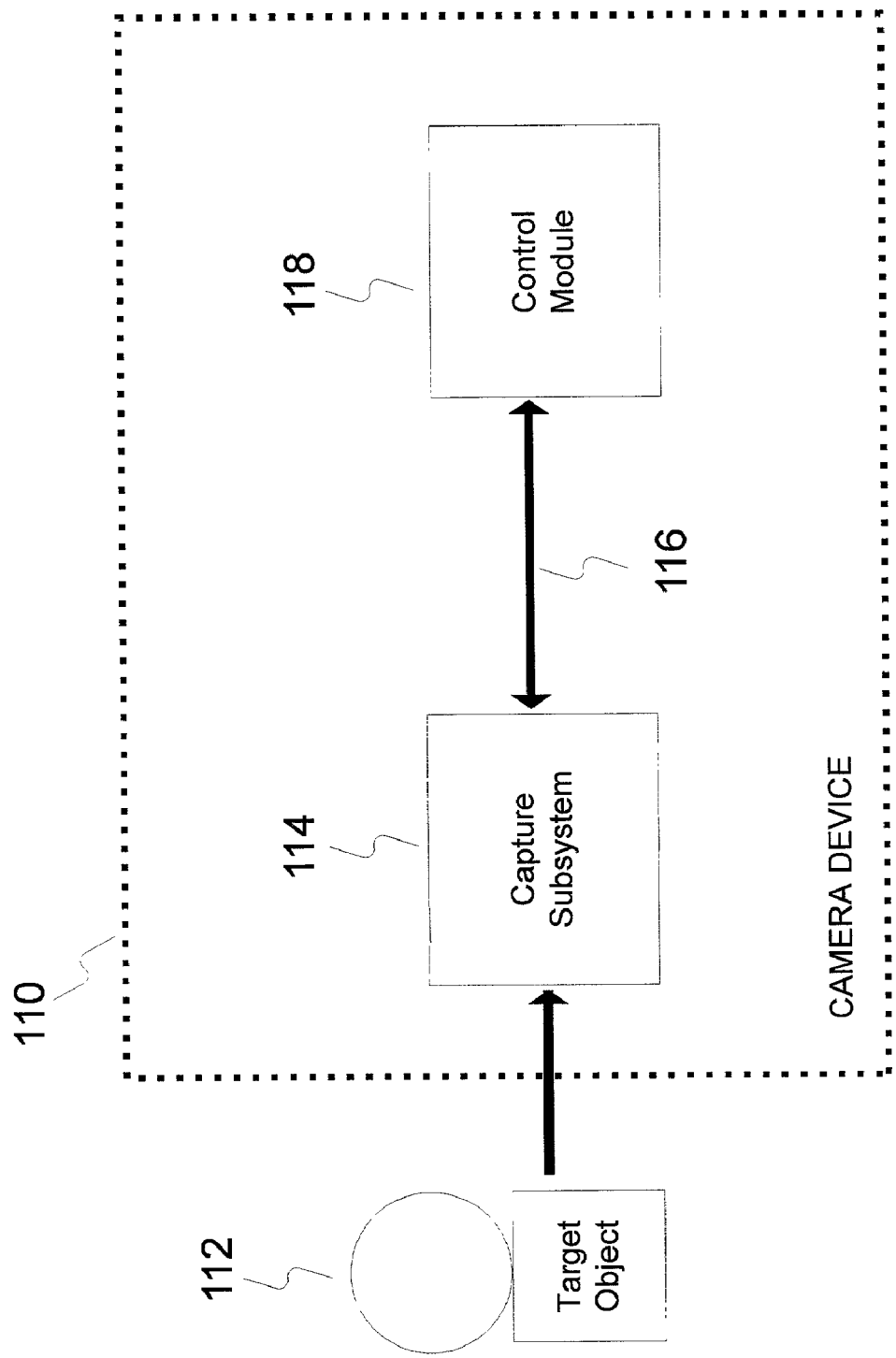
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may readily be implemented as a scanner device or a video camera device. Furthermore, the present invention may readily be implemented in any effective manner. For example, the present invention may be implemented as software instructions executed by an electronic device, and/or as appropriate hardware devices.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
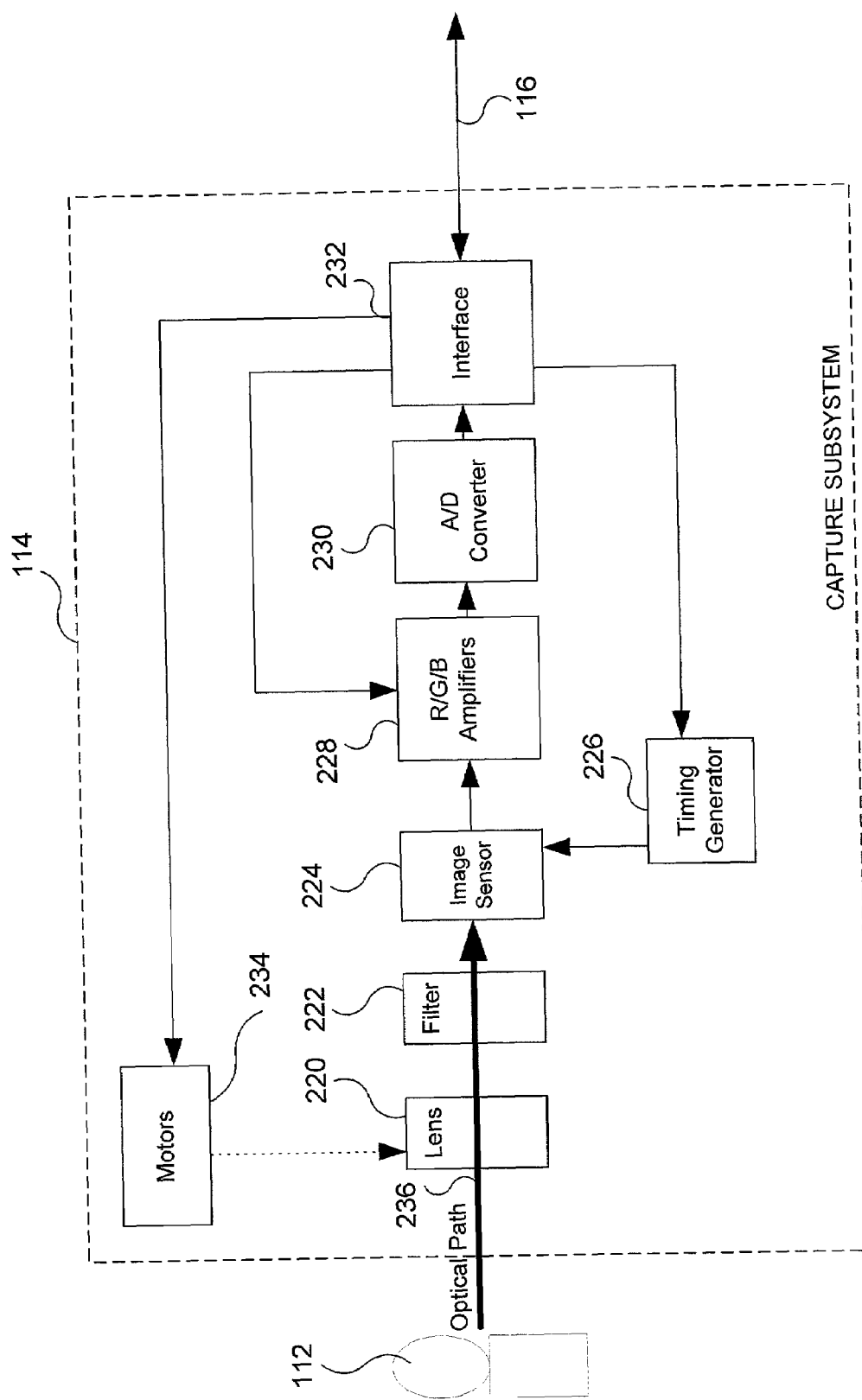
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises, but is not limited to, a lens 220 having an iris (not shown), a filter 222, an image sensor 224, a timing generator 226, red, green, and blue amplifiers 228, an analog-to-digital (A/D) converter 230, an interface 232, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which may preferably include a charged-coupled device (CCD), may responsively generate a set of image data representing the target object 112. The image data may then be routed through red, green, and blue amplifiers 228, A/D converter 230, and interface 232. Interface 232 may preferably include separate interfaces for controlling ASP 228, motors 234, timing generator 226, and red, green, and blue amplifiers 228. From interface 232, the image data passes over system bus 116 to control module 118 for appropriate processing and storage. Other types of image capture sensors, such as CMOS or linear arrays are also contemplated for capturing image data in conjunction with the present invention.

Figure 3:
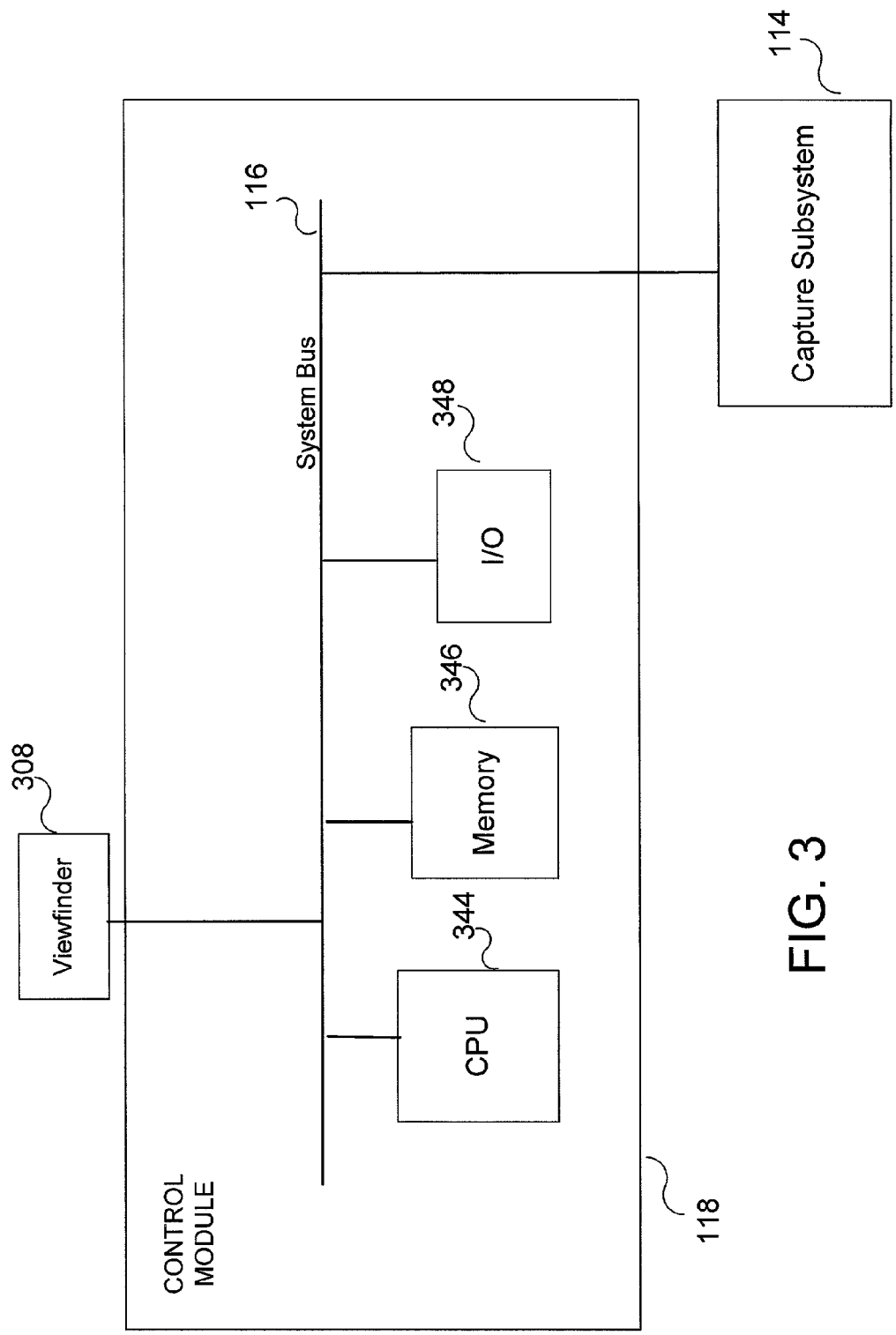
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Alternately, CPU 344 may be implemented using any other appropriate technology. For example, CPU 344 may be implemented to include certain application-specific integrated circuits (ASICS) or other appropriate electronic devices. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. The operation and utilization of control module 118 is further discussed below in conjunction with FIGS. 4 through 11.

Figure 4:
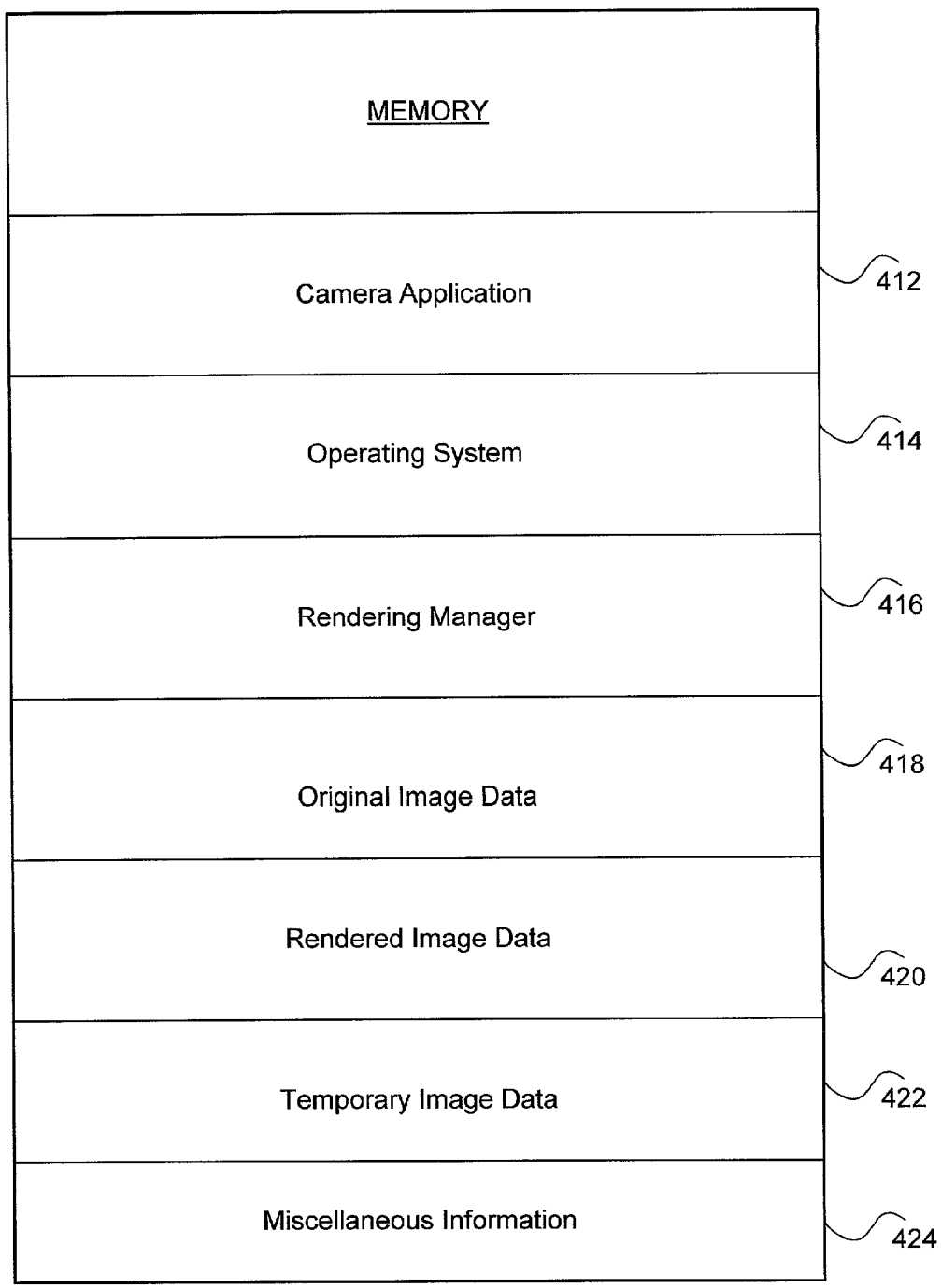
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may preferably include, but is not limited to, a camera application 412, an operating system 414, a rendering manager 416, original image data 418, rendered image data 420, temporary image data 422, and miscellaneous information 424. In alternate embodiments, memory 346 may readily include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, rendering manager 416 may preferably control and coordinate an image rendering procedure to convert original image data 418 into rendered image data 420. In alternate embodiments, rendering manager 416 may be implemented using one or more hardware devices that perform the same or similar functions as those described herein for operation of the software instructions forming rendering manager 416.

In the FIG. 4 embodiment, temporary image data 422 may include any type of image information that is temporarily required for performing the foregoing image rendering procedure. Miscellaneous routines 424 may include any desired software instructions or types of data to facilitate functions performed by camera device 110. The operation and utilization of rendering manager 416 is further discussed below in conjunction with FIGS. 5 through 8.

Figure 5:
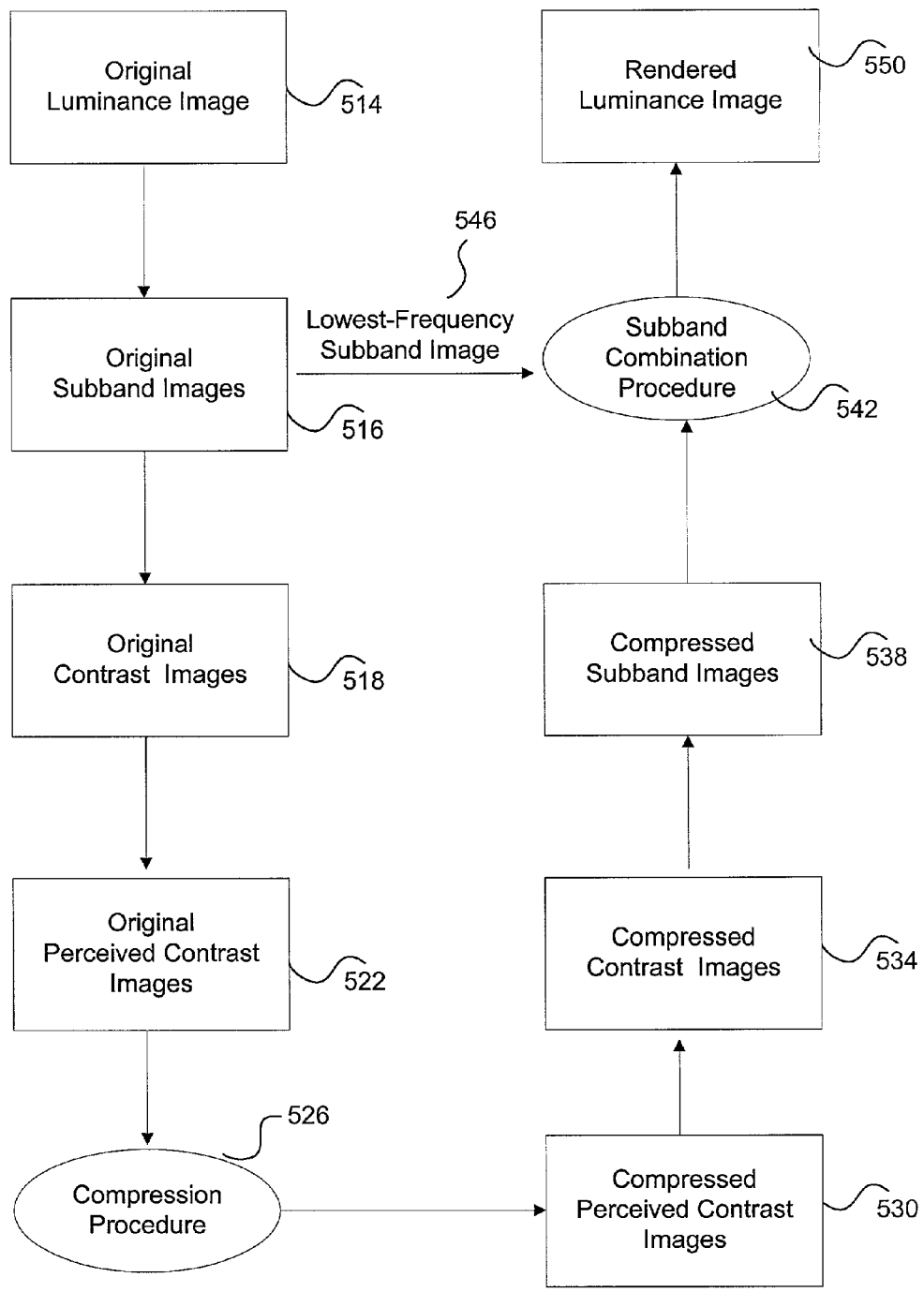
FIG. 5 is a block diagram illustrating an image rendering procedure, in accordance with one embodiment of the present invention.

Referring now to FIG. 5, a block diagram illustrating an image rendering procedure 510 is shown, in accordance with one embodiment of the present invention. In alternate embodiments of the present invention, image rendering procedures may readily be performed with various other configurations, and may also include various elements or steps that are different from those discussed in conjunction with the FIG. 5 embodiment.

Imaging technology typically strives to accurately reproduce the impression an observer receives when looking at a particular scene or object. However, a substantial difference still remains in how a camera captures a scene, as compared to what the human visual system is capable of achieving. One of the primary restrictions in consumer digital still cameras (DSC) is the limited dynamic range. At least three distinctive factors within the camera architecture can be identified as being responsible.

The first factor is the transformation of the analog signal from a charge-coupled device (CCD) into a digital signal. Currently, 12 bits are typically used. Naturally, that number limits the capability of the camera to simultaneously capture details in very light and very dark areas. The second factor is the number of bits available for the final output image of the camera. That number is typically 8 bits per channel, and is closely related to capabilities of different output devices like computer screens and TV monitors. The last factor concerns the specific transformation that is used to convert a twelve bits/channel image into an eight bits/channel image. The present invention addresses transforming a high dynamic range image into a low dynamic range image. The high dynamic range image could, for example, be a 12 bit per channel image from an A/D converter, or it could be an image that has been calculated from several corresponding images at different exposures.

Currently, a typical digital still camera may have difficulty in capturing a scene with a high dynamic range, i.e. a scene which contains very bright and very dark areas. Either the scene may be accurately reproduced in the very bright areas, and the dark areas may lose details and may appear uniform (black), or the dark areas are accurate, and the bright areas may lose detail and may appear saturated (usually white).

An ideal system would "measure" the perception that a human observer has of a scene and produce an image that would be perceived by the observer in the same way as the original scene. Perception consists of a collection of attributes, but certain embodiments of the present invention focus on the attribute of perceived contrast. The present invention provides a transformation from a high dynamic range image into a low dynamic range image, which performs the necessary compression, but which results in an image that is perceptually as close as possible to the original scene.

With regard to capturing original image data, the present invention may operate on raw image data from a single source. However, in alternate embodiments, if a scene is not properly captured due to the limited dynamic range of the camera, several differently exposed images may be used to record every detail of interest in the scene. To merge the source images into a single image, the capture algorithm first typically assumes that the images are aligned with respect to each other. If this is not the case, then the source images may be aligned using a motion estimation algorithm.

It is further assumed that the capture algorithm has access to camera raw data, i.e. the data that is delivered by the camera sensor (CCD). By using the aperture and shutter speed values of the image, as well as the OECF function of the camera, a radiance image may be built. This radiance image preferably contains a luminance value for each pixel of the scene. The images may be merged together in a Bayesian framework in which each pixel is considered as a Gaussian Random Variable with a mean value equal to the pixel luminance value, and a variance derived from a prior knowledge of the camera characteristics. The pixel value of the final image (original image data 418) may be computed by taking the most efficient estimate of pixels in all the source images corresponding to the same object in the scene.

In accordance with the present invention, a rendering manager 416 (FIG. 4) may initially decompose the original image data 418 into one achromatic channel (herein referred to as original luminance image 514) and two chromatic channels. Rendering manager 416 may then preferably process original luminance image 514 while the chrominance information is kept unchanged during the image rendering procedure.

In general terms, rendering manager 416 may preferably perform the image rendering procedure 510 by initially transforming the original luminance image 514 into a perceptual contrast space, taking the luminance, the spatial frequency, and the respective contrast threshold into account. Rendering manager 416 may then perform a compression procedure on the data in the perceived contrast space in order to comply with the limited dynamic range available for final output of the digital still camera. Finally, rendering manager may preferably transform the compressed image data back into an image space for display or other use by a system user.

In the FIG. 5 embodiment, in order to bring original luminance image 514 into perceptual contrast space, a contrast sensitivity function may preferably be computed. Several relevant parameters may preferably include luminance and spatial frequency. Spatial frequency may be defined as the frequency of contrast changes in an image within a given physical distance in the same image. To introduce dependence on spatial frequency, a multi-resolution approach may preferably be utilized.

Rendering manager 416 may therefore preferably divide original luminance image 514 into a plurality of original subband images 516 of differing frequencies by using a third-order spline wavelet filter bank or other appropriate means. Each original subband image 516 may then preferably be treated separately. The original subband image 516 containing the highest frequency component may preferably be centered around 16 cycles/degree, and the number of original subband images 516 may be such that the lowest-frequency subband image 546 in the multi-resolution pyramid contains less than 10 pixel values.

For each original subband image 516 (with the exception of lowest-frequency subband image 546), rendering manager 416 may preferably compute a corresponding original contrast image 518 by calculating individual pixel values $M_p$ according to the following equation:

$$M_p = \frac{L_p - L_A}{|L_A| + s} \quad (3.1)$$

where $L_p$ is a luminance value at a particular location p in an original subband image 516, $L_A$ is a luminance average around the location p (which may be equal to a pixel value at a corresponding location in a next-lower frequency original subband image 516), and s is a saturation term to avoid divisions by zero. In the FIG. 5 embodiment, s should be set using a maximum allowable contrast. For example, in certain embodiments, s may be approximately equal to 0.01.

Rendering manager 416 may then transform the original contrast images into perceptual space to produce original perceived contrast images 522. Rendering manage 416 may preferably begin by computing a diameter of a pupil of the human eye d according to the following equation:

$$d = 5 - 3 \tan h(0.4 \log_{10} L) \text{ [mm]} \quad (3.2)$$

where L is a mean luminance of a captured scene expressed in $cd/m^2$ (candelas per square meter).

Then, for each pixel in each original subband image 516 (with the exception of lowest-frequency subband image 546), rendering manager 416 may compute an original contrast threshold $m_t$ by utilizing the following equation:

$$m_t = \frac{k}{M_{opt}(u)} \sqrt{\frac{2}{T}\left(\frac{1}{X_o^2} + \frac{1}{X_{MAX}^2} + \frac{u^2}{N_{MAX}^2}\right)\left(\frac{1}{\eta p E} + \frac{\phi_0}{1 - e^{-\left(\frac{u}{u_0}\right)^2}}\right)} \quad (3.3)$$

where u is a spatial frequency value for a corresponding pixel and the surrounding pixels, $X_0$ is an object size for the captured scene expressed in angular degrees for the human eye, $N_{max}$ is a maximum number of cycles that a human eye can integrate, $X_{max}$ is a maximum object size that a human eye can integrate expressed in angular degrees for the human eye, $\eta$ is the quantum efficiency of cones in a human eye defined as an average number of photons causing an excitation of photo-receptors divided by a number of photons entering the human eye, p is a photon conversion factor for converting light units in units for flux density of photons, and may be defined as a number of photons per unit of time per unit of angular area per unit of luminous flux per angular area of light entering the human eye, E is a retinal illuminance value for the captured scene expressed in Trolands, $\phi_0$ is a spectral density of neural noise caused by statistical fluctuations in a signal transport to the human brain, $u_o$ is a lateral inhibition frequency limit, k is a signal-to-noise ratio of the captured scene, $M_{opt}(u)$ is an optical modulation transfer function that describes filtering of modulation by an image forming system, such as the human eye, as a function of spatial frequency, and T is an integration time of the human eye.

In the FIG. 5 embodiment, rendering manager 416 may preferably compute the foregoing retinal illuminance E in accordance with the following equation:

$$E = \frac{\pi d^2}{4} L_A \left[1 - \left(\frac{d}{9.7}\right)^2 + \left(\frac{d}{12.4}\right)^4\right] \quad (3.4)$$

where d is a pupil diameter of the human eye in mm, and $L_A$ is a luminance average around a location p of a considered pixel, expressed in $cd/m^2$. The result is expressed in Trolands [Td].

In the FIG. 5 embodiment, rendering manager 416 may preferably compute the optical modulation function $M_{opt}(u)$ according to the following equation:

$$M_{opt}(u) = e^{-2\pi^2 \sigma^2 u^2}$$

$$\sigma = \sqrt{\sigma_0^2 + (c_{ab}d)^2} \quad (3.5)$$

where d is a pupil diameter of the human eye, u is a spatial frequency value, $\sigma_0$ is a point spread function basic width expressed in degrees, and $c_{ab}$ describes an increase of the point spread function width at an increasing pupil size.

In accordance with certain embodiments of the present invention, a set of exemplary values for the parameters involved in foregoing equations 3.3, 3.4, and 3.5 is given in Table 1. In alternate embodiments, the present invention may readily utilize other values than those shown in the following Table 1.

| | | |
|---|---|---|
| k = 3 | T = 0.1 sec | n = 0.03 |
| $\sigma_0$ = 0.0083 deg | $X_{max}$ = 12 deg | $\phi_0$ = 3 × $10^{-8}$ sec $deg^2$ |
| $C_{ab}$ = 0.0013 deg/mm | $X_0$ = 60 deg | $u_0$ = 7 cycles/deg |
| p = 1.24 × $10^6$ photons/(sec. $deg^2$. Td) | $N_{max}$ = 15 cycles | |

Table 1. Exemplary Parameters for Contrast Sensitivity Function.

In accordance with the FIG. 5 embodiment, rendering manager 416 may then transform original contrast images 518 into original perceived contrast images 522 by calculating individual pixel values $C_p$ with the following equation:

$$C_p = \sqrt{\frac{M_p}{m_t}} \quad (3.6)$$

where $M_p$ is an original pixel contrast value from original contrast images 518 and $m_t$ is a corresponding original contrast threshold.

In the FIG. 5 embodiment, rendering manager 416 may then perform a compression procedure on original perceived contrast images 522 using any effective means. In the FIG. 5 embodiment, the effect of the compression procedure is preferably to keep small pixel amplitudes constant (or amplify them slightly), and to reduce large pixel amplitudes.

An example of one such a compression procedure is given in Table 2 below, where $C_{cp}$ is the output of the compression procedure which is referred to herein as compressed perceived contrast images 530.

| Cp | Cp |
|---|---|
| −∞ | −10 |
| −15 | −10 |
| −8 | −7 |
| −5 | −5 |
| −1 | −1.2 |
| 1 | 1.2 |
| 5 | 5 |
| 8 | 7 |
| 15 | 10 |
| +∞ | 10 |

Table 2. Compression Function Applied to Perceptual Contrast Space.

In the FIG. 5 embodiment, rendering manage 416 may then transform compressed perceived contrast images 530 from perceptual space back into an image space where they can be displayed or otherwise utilized. In the FIG. 5 embodiment, the luminance range of an intended output display is assumed to be known. For instance, if the output display is a CRT monitor, the luminance range may typically range from 0 cd/m² to 100 cd/m². To compute the adaptation of a human eye, rendering manager 416 may specify a mean value of the output display, Lout, which should be within the display range. By default, a middle point of the range may be taken, such as 50 cd/m². Then, rendering manager 416 may compute a pupil diameter d for viewing the display by utilizing foregoing equation 3.2, and setting $L=L_{out}$.

In the FIG. 5 embodiment, for each pixel location p, rendering manager 416 may then compute a display contrast threshold by utilizing a average surrounding pixel value $L_A$ at location p. Rendering manager 416 may calculate the display contrast threshold by utilizing foregoing equations 3.3 and 3.4. Then, rendering manager 416 may utilize the inverse of foregoing equation 3.6 to obtain a series of compressed contrast images 534. Rendering manager 416 may next utilize the inverse of equation 3.1 to retrieve a corresponding series of compressed subband images 538.

In the FIG. 5 embodiment, rendering manager 416 may then process the only original subband image 516 that has not gone through the contrast and perceptual mapping of equations 3.1 and 3.6, namely the lowest-frequency subband image 546. Ideally, lowest-frequency subband image 546 should be composed of a single pixel, but for practical reasons, if the original image size if not a power of two, it may be preferable to keep lowest-frequency subband image 546 to a size of approximately 10 pixels.

Rendering manager 416 may linearly rescale lowest-frequency subband image 546 such that its mean value is equal to the mean output luminance $L_{out}$. Then, iteratively, rendering manager 416 may add each compressed subband image 538 to lowest-frequency subband image 546 to eventually produce rendered luminance image 550 for display after recombination with the corresponding chrominance information. In the FIG. 5 embodiment, to add an initial compressed subband image 538 to lowest-frequency subband image 546, rendering manager 416 may preferably upscale lowest-frequency subband image 546 by a factor of two to match the size of the initial compressed subband image 538.

In the FIG. 5 embodiment, rendering manager 416 may begin a subband combination procedure 542 by adding an initial compressed subband image 538 (the next-to-lowest compressed subband image) to lowest-frequency subband image 546 (upscaled by a factor of 2) to thereby generate a current combined subband image. Rendering manager 416 may then continue the subband combination procedure 542 by sequentially adding each of the remaining compressed subband images 538 to the current combined subband image in an order of ascending subband frequencies to finally produce rendered luminance image 550.

The present invention thus utilizes a rather complete model for the description of perceived contrast, and makes extensive use of the contrast sensitivity function of the human visual system, also taking into account the dependence on a set of parameters. In addition, the present invention performs an explicit compression of the perceived contrast, and treats lowest-frequency subband image 546 in a manner that is an alliance with treatment of the higher frequency subband images. Therefore, as compared to other approaches, the present invention provides a strong connection to the way in which human beings perceive high contrast scenes.

The present invention may be implemented in hardware inside a digital still camera or other device to covert image data from, for example, 12 bits per channel down to 8 bits per channel. Another possibility would be to apply the algorithm in the form of a software module to high dynamic images gained either directly from a digital still camera, or to a high dynamic range image that has been calculated from several images with different exposures.

The foregoing approach may be utilized in digital still cameras, but may also be readily extended for video cameras. In that case, the time parameter should also be considered in calculating the contrast threshold. Another possibility is to apply the current algorithms in the field of Computer Graphics. The current algorithm may not only be used to optimize perceived contrast, but may also increase perceived contrast by changing the compression function mentioned above. Another natural extension is to apply the algorithm not only to the luminance channel, but also to the two chromatic channels.

Figure 6:
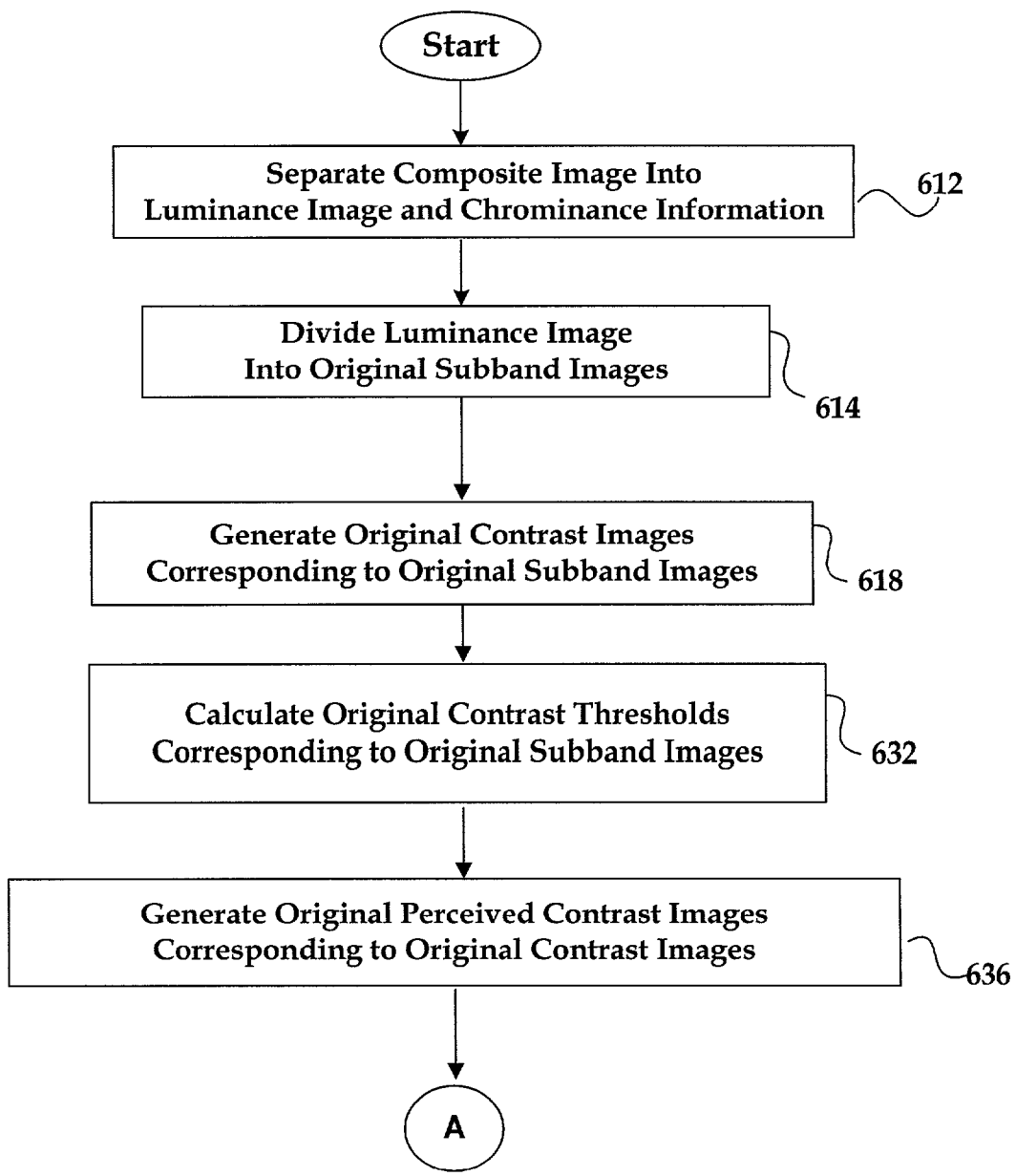
FIG. 6 is a flowchart of initial method steps for performing an image rendering procedure, in accordance with one embodiment of the present invention.

Referring now to FIG. 6, a flowchart of initial method steps for performing an image rendering procedure 510 is shown, in accordance with one embodiment of the present invention. The FIG. 6 embodiment is presented for purposes of illustration, and in alternate embodiments, the present invention may readily utilize various other steps and sequences than those discussed in conjunction with the FIG. 6 embodiment.

In the FIG. 6 embodiment, in step 612, rendering manager 416 may initially separate a composite image (from original image data 418 of FIG. 4) into an original luminance image 514 (FIG. 5) and chrominance information. Then, in step 614, rendering manager 416 may preferably divide original luminance image 514 into original subband images 516 using any appropriate technique or method. For example, rendering manager 416 may utilize techniques similar to those discussed in conjunction with foregoing FIG. 5.

In step 618, rendering manager 416 may preferably generate original contrast images 518 that each correspond to one of the original subband images 516 by utilizing any appropriate means. In certain embodiments, rendering manager 416 may preferably generate original contrast images 518 in accordance with equation 3.1, as discussed above in conjunction with foregoing FIG. 5.

In step 632, rendering manager 416 may preferably calculate original contrast thresholds that correspond to the original subband images 516. In certain embodiments, rendering manager 416 may preferably calculate original contrast thresholds in accordance with equation 3.3, as discussed above in conjunction with FIG. 5. Finally, in step 636, rendering manager 416 may preferably generate original perceived contrast images 522 that each correspond to one of the original contrast images 518 by utilizing any appropriate and effective means. In the FIG. 6 embodiment, rendering manager 416 may preferably generate perceived contrast images 522 in accordance with equation 3.3, as discussed above in conjunction with FIG. 5. The FIG. 6 process may then preferably advance to letter "A" of FIG. 7.

Figure 7:
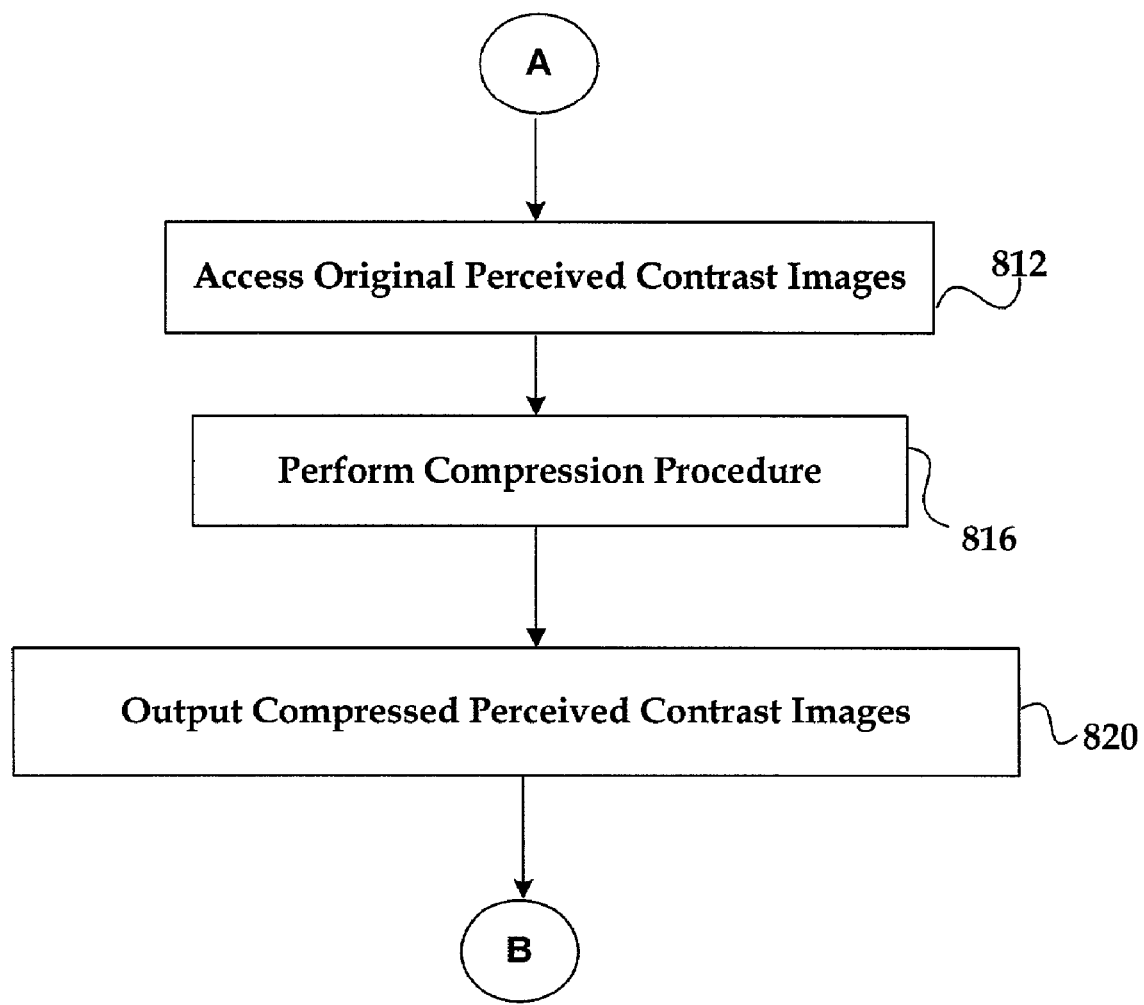
FIG. 7 is a flowchart of method steps for performing a compression procedure, in accordance with one embodiment of the present invention.

Referring now to FIG. 7, a flowchart of method steps for performing a compression procedure 526 is shown, in accordance with one embodiment of the present invention. The FIG. 7 embodiment is presented for purposes of illustration, and in alternate embodiments, the present invention may readily utilize various other steps and sequences than those discussed in conjunction with the FIG. 7 embodiment.

In the FIG. 7 embodiment, in step 812, rendering manager 416 may preferably access the original perceived contrast images 522 that were discussed above in conjunction with FIG. 6. Then, in step 816, rendering manager 416 may preferably perform a compression procedure 526 upon the original perceived contrast images 522 to produce corresponding compressed perceived contrast images 820. In the FIG. 7 embodiment, the compression procedure 526 may utilize any appropriate techniques to reduce the dynamic range of the original perceived contrast images 522. For example, the compression procedure 526 may utilize techniques similar to those discussed above in conjunction with FIG. 5. Finally, in step 820, the compression procedure 816 may preferably output the compressed perceived contrast images 820 for further processing by rendering manager 416. The FIG. 7 process may then preferably advance to letter "B" of FIG. 8.

Figure 8:
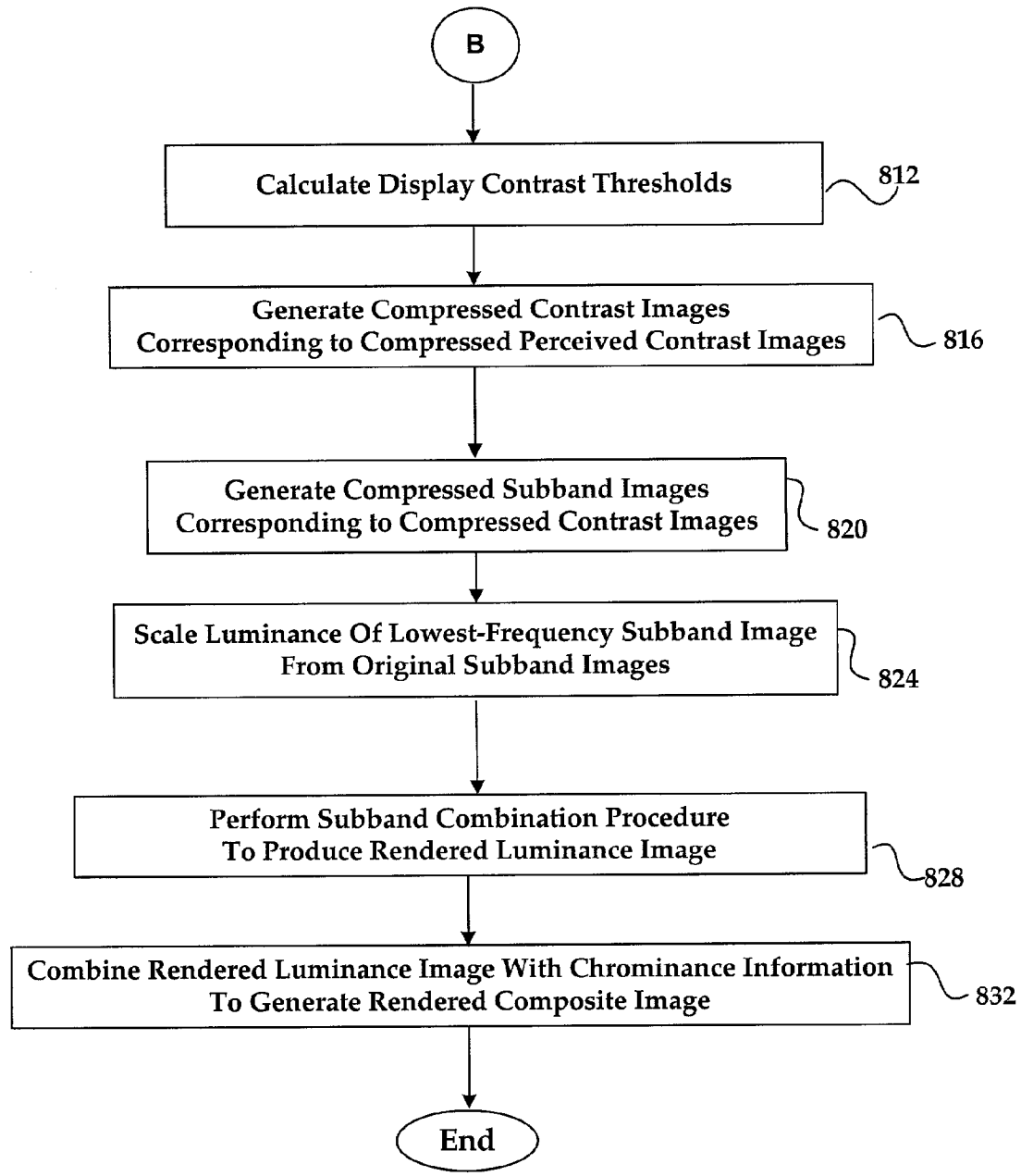
FIG. 8 is a flowchart of final method steps for performing an image rendering procedure, in accordance with one embodiment of the present invention.

Referring now to FIG. 8, a flowchart of final method steps for performing an image rendering procedure 510 is shown, in accordance with one embodiment of the present invention. The FIG. 8 embodiment is presented for purposes of illustration, and in alternate embodiments, the present invention may readily utilize various other steps and sequences than those discussed in conjunction with the FIG. 8 embodiment.

In the FIG. 8 embodiment, in step 812, rendering manager 416 may preferably calculate display contrast thresholds corresponding to the particular type of display upon which rendered image data 420 is ultimately viewed. In certain embodiments, rendering manager 416 may preferably calculate display contrast thresholds $m_t$ in accordance with equation 3.3, as discussed above in conjunction with FIG. 5.

Then, in step 816, rendering manager 416 may preferably generate compressed contrast images 534 corresponding to the compressed perceived contrast images 530 by utilizing any appropriate technique. In certain embodiments, rendering manager 416 may preferably generate pixel values $M_p$ for compressed contrast images 534 in accordance with equation 3.6 by utilizing pixel values $C_p$ from compressed perceived contrast images 530 and the foregoing calculated display contrast thresholds $m_t$, as discussed above in conjunction with FIG. 5.

Next, in step 820, rendering manager 416 may preferably generate compressed subband images 538 corresponding to the compressed contrast images 534 by utilizing any appropriate technique. In certain embodiments, rendering manager 416 may preferably generate pixel values $L_p$ for compressed subband images 538 in accordance with equation 3.1 by utilizing pixel values $M_p$ from compressed contrast images 534 and appropriate surrounding luminance average values $L_A$, as discussed above in conjunction with FIG. 5.

In step 824, rendering manager 416 may preferably scale pixel luminance values of the lowest-frequency subband image 546 from original subband images 516 so that a mean pixel luminance value of lowest-frequency subband image 546 matches a mean luminance value of the particular type of display upon which rendered image data 420 is ultimately viewed.

In step 828, rendering manager 416 may then preferably perform a subband combination procedure 542 to combine lowest-frequency subband image 546 and compressed subband images 538 to thereby produce a single rendered luminance image 550. As discussed above in conjunction with FIG. 5, in certain embodiments, rendering manager 416 may preferably begin subband combination procedure 542 by adding an initial compressed subband image 538 (the next-to-lowest compressed subband image) to lowest-frequency subband image 546 (upscaled by a factor of 2) to thereby generate a current combined subband image. Rendering manager 416 may then continue the subband combination procedure 542 by sequentially adding each of the remaining compressed subband images 538 to the current combined subband image in an order of ascending subband frequencies to finally produce rendered luminance image 550.

Finally, in step 832, rendering manager 416 may preferably combine rendered luminance image 550 with corresponding chrominance information to generate a rendered composite image that may be stored as rendered image data 420 in memory 346. A system user may then access and utilize rendered image data 420 in any appropriate manner.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image rendering procedure, comprising:
   a rendering manager configured to divide an original luminance image into a plurality of original subband images which are then converted into original perceived contrast images, said rendering manager performing a compression procedure upon said original perceived contrast images to produce compressed perceived contrast images, said rendering manager then converting said compressed perceived contrast images into compressed subband images that are combined together during a subband combination procedure to generate a rendered luminance image; and
   a processor coupled to said system for controlling said rendering manager.

2. The system of claim 1 wherein said rendering manager performs said image rendering procedure on original composite image data captured by a digital still camera, said rendering manager being implemented as at least one of software program instructions and electronic hardware circuitry.

3. The system of claim 2 wherein said rendering manager separates said original composite image data into said original luminance image and chrominance information.

4. The system of claim 3 wherein said rendering manager divides said original luminance image into said original subband images by utilizing a least one of a third-order spline wavelet filter bank and a software filtering program.

5. The system of claim 4 wherein said rendering manager converts said original subband images into original contrast images, except for a lowest-frequency subband image which is not converted into one of said original contrast images.

6. The system of claim 5 wherein said rendering manager converts said original subband images into said original contrast images by calculating individual pixel values $M_p$ according to an equation 3.1:

$$M_p = \frac{L_p - L_A}{|L_A| + s} \tag{3.1}$$

where $L_p$ is a luminance value at a location p in one of said original subband images, $L_A$ is a luminance average around said location p, and s is a saturation term to avoid divisions by zero.

7. The system of claim 5 wherein said rendering manager calculates original contrast thresholds that correspond to respective ones of said original subband images.

8. The system of claim 7 wherein said rendering manager calculates said original contrast thresholds, $m_t$, based upon properties of human vision for individual pixels corresponding to said original subbands according to an equation 3.3:

$$m_t = \frac{k}{M_{opt}(u)} \sqrt{\frac{2}{T}\left(\frac{1}{X_o^2} + \frac{1}{X_{MAX}^2} + \frac{u^2}{N_{MAX}^2}\right)\left(\frac{1}{\eta pE} + \frac{\phi_0}{1 - e^{-\left(\frac{u}{u_0}\right)^2}}\right)} \tag{3.3}$$

where u is a spatial frequency value for a pixel and surrounding pixels, $X_0$ is an object size for a captured scene expressed in angular degrees for a human eye, $N_{max}$ is a maximum number of cycles that said human eye can integrate, $X_{max}$ is a maximum object size that said human eye can integrate, $\eta$ is a quantum efficiency of cones in said human eye, p is a photon conversion factor for converting light units, E is a retinal illuminance value for said captured scene, $\phi_0$ is a spectral density of neural noise, $u_0$ is a lateral inhibition frequency limit, k is a signal-to-noise ratio of said captured scene, $M_{opt}(u)$ is an optical modulation transfer function, and T is an integration time of said human eye.

9. The system of claim 8 wherein said rendering manager computes said retinal illuminance value E in accordance with an equation 3.4:

$$E = \frac{\pi d^2}{4} L_A \left[1 - \left(\frac{d}{9.7}\right)^2 + \left(\frac{d}{12.4}\right)^4\right] \tag{3.4}$$

where d is a pupil diameter of said human eye, and $L_A$ is a luminance average around a location p of said pixel.

10. The system of claim 9 wherein said rendering manage computes said pupil diameter d according to an equation 3.2:

$$d = 5 - 3 \tan h(0.4 \log_{10} L) \text{ [mm]} \tag{3.2}$$

where L is a mean luminance of said captured scene.

11. The system of claim 8 wherein said rendering manager computes said optical modulation transfer function $M_{opt}(u)$ according to an equation 3.5:

$$M_{opt}(u) = e^{-2\pi^2 \sigma^2 u^2}$$

$$\sigma = \sqrt{\sigma_0^2 + (C_{ab} d)^2} \tag{3.5}$$

where d is a pupil diameter of said human eye, u is said spatial frequency value, $\sigma_0$ is a point spread function basic width, and $C_{ab}$ describes an increase of said point spread function basic width at an increasing pupil size.

12. The system of claim 8 wherein said rendering manager generates said original perceived contrast images that correspond to said original contrast images by utilizing said original contrast thresholds and said original contrast images.

13. The system of claim 12 wherein said rendering manager computes said original perceived contrast images by calculating individual pixel values $C_p$ according to an equation 3.6:

$$C_p = \sqrt{\frac{M_p}{m_t}} \tag{3.6}$$

where $M_p$ is an original pixel contrast value from said original contrast images, and $m_t$ is a corresponding one of said original contrast thresholds.

14. The system of claim 1 wherein said rendering manager performs said compression procedure upon said original perceived contrast images to thereby keep small pixel amplitudes relatively constant, and to thereby reduce large pixel amplitudes.

15. The system of claim 1 wherein said rendering manager calculates display contrast thresholds, $m_t$, corresponding to an intended display device, for individual pixels corresponding to said original subbands according to an equation 3.3:

$$m_t = \frac{k}{M_{opt}(u)} \sqrt{\frac{2}{T}\left(\frac{1}{X_o^2} + \frac{1}{X_{MAX}^2} + \frac{u^2}{N_{MAX}^2}\right)\left(\frac{1}{\eta pE} + \frac{\phi_0}{1 - e^{-\left(\frac{u}{u_0}\right)^2}}\right)} \tag{3.3}$$

where u is a spatial frequency value for a pixel and surrounding pixels, $X_0$ is an object size for a displayed scene expressed in angular degrees for a human eye, $N_{max}$ is a maximum number of cycles that said human eye can integrate, $X_{max}$ is a maximum object size that said human eye can integrate, $\eta$ is a quantum efficiency of cones in said human eye, p is a photon conversion factor for converting light units, E is a retinal illuminance value for said displayed scene, $\phi_0$ is a spectral density of neural noise, uo is a lateral inhibition frequency limit, k is a signal-to-noise ratio of said displayed scene, $M_{opt}(u)$ is an optical modulation transfer function, and T is an integration time of said human eye.

16. The system of claim 15 wherein said rendering manager generates compressed contrast images, $M_p$, corresponding to said compressed perceived contrast images, $C_p$, by calculating individual pixel values according to a permutation of an equation 3.6:

$$C_p = \sqrt{\frac{M_p}{m_t}} \quad (3.6)$$

where $C_p$ is a pixel value from one of said compressed perceived contrast images, and $m_t$ is a corresponding one of said display contrast thresholds.

17. The system of claim 16 wherein said rendering manager generates compressed subband images corresponding to said compressed contrast values, $M_p$, by calculating individual pixel values $L_p$ according to a permutation of an equation 3.1:

$$M_p = \frac{L_p - L_A}{|L_A| + s} \quad (3.1)$$

where $M_p$ is a contrast value at a location p in one of said compressed contrast images, $L_A$ is a luminance average around said location p, and s is a saturation term to avoid divisions by zero.

18. The system of claim 17 wherein said rendering manager linearly rescales a lowest-frequency subband image from said original subband images such that a mean luminance value from said lowest-frequency subband image is equal to a mean output luminance of said intended display device.

19. The system of claim 18 wherein said rendering manager performs said subband combination procedure by initially adding a next-to-lowest compressed subband image to said lowest-frequency subband image to produce a current combined subband image, said rendering manager then continuing said subband combination procedure by sequentially adding each remaining one of said compressed subband images to said current combined subband image in an order of ascending subband frequencies to finally produce said rendered luminance image.

20. The system of claim 19 wherein said rendering manager combines said rendered luminance image with corresponding chrominance information to produce composite rendered image data for use by a system user.

21. A method for performing an image rendering procedure, comprising the steps of:
dividing an original luminance image into a plurality of original subband images by utilizing a rendering manager;
converting said original subband images into original perceived contrast images with said rendering manager;
performing a compression procedure upon said original perceived contrast images to produce compressed perceived contrast images;
converting said compressed perceived contrast images into compressed subband images with said rendering manager; and
combining said compressed subband images together during a subband combination procedure to generate a rendered luminance image.

22. The method of claim 21 wherein said rendering manager performs said image rendering procedure on original composite image data captured by a digital still camera, said rendering manager being implemented as at least one of software program instructions and electronic hardware circuitry.

23. The method of claim 22 wherein said rendering manager separates said original composite image data into said original luminance image and chrominance information.

24. The method of claim 23 wherein said rendering manager divides said original luminance image into said original subband images by utilizing a least one of a third-order spline wavelet filter bank and a software filtering program.

25. The method of claim 24 wherein said rendering manager converts said original subband images into original contrast images, except for a lowest-frequency subband image which is not converted into one of said original contrast images.

26. The method of claim 25 wherein said rendering manager converts said original subband images into said original contrast images by calculating individual pixel values $M_p$ according to an equation 3.1:

$$M_p = \frac{L_p - L_A}{|L_A| + s} \quad (3.1)$$

where $L_p$ is a luminance value at a location p in one of said original subband images, $L_A$ is a luminance average around said location p, and s is a saturation term to avoid divisions by zero.

27. The method of claim 25 wherein said rendering manager calculates original contrast thresholds that correspond to respective ones of said original subband images.

28. The method of claim 27 wherein said rendering manager calculates said original contrast thresholds, $m_t$, based upon properties of human vision got individual pixels corresponding to said original subbands according to an equation 3.3:

$$m_t = \frac{k}{M_{opt}(u)} \sqrt{\frac{2}{T}\left(\frac{1}{X_O^2} + \frac{1}{X_{MAX}^2} + \frac{u^2}{N_{MAX}^2}\right)\left(\frac{1}{\eta p E} + \frac{\phi_0}{1 - e^{-\left(\frac{u}{u_0}\right)^2}}\right)} \quad (3.3)$$

where u is a spatial frequency value for a pixel and surrounding pixels, $X_0$ is an object size for a captured scene expressed in angular degrees for a human eye, $N_{max}$ is a maximum number of cycles that said human eye can integrate, $X_{max}$ is a maximum object size that said human eye can integrate, $\eta$ is a quantum efficiency of cones in said human eye, p is a photon conversion factor for converting light units, E is a retinal illuminance value for said captured scene, $\phi_0$ is a spectral density of neural noise, $u_0$ is a lateral inhibition frequency limit, k is a signal-to-noise ratio of said captured scene, $M_{opt}(u)$ is an optical modulation transfer function, and T is an integration time of said human eye.

29. The method of claim 28 wherein said rendering manager computes said retinal illuminance value E in accordance with an equation 3.4:

$$E = \frac{\pi d^2}{4} L_A \left[1 - \left(\frac{d}{9.7}\right)^2 + \left(\frac{d}{12.4}\right)^4\right] \quad (3.4)$$

where d is a pupil diameter of said human eye, and $L_A$ is a luminance average around a location p of said pixel.

30. The method of claim 29 wherein said rendering manage computes said pupil diameter d according to an equation 3.2:

$$d = 5 - 3 \tan h(0.4 \log_{10} L) \text{ [mm]} \quad (3.2)$$

where L is a mean luminance of said captured scene.

31. The method of claim 28 wherein said rendering manager computes said optical modulation transfer function $M_{opt}(u)$ according to an equation 3.5:

$$M_{opt}(u) = e^{-2\pi^2 94^2 u^2}$$

$$\sigma = \sqrt{\sigma_0^2 + (C_{ab}d)^2} \quad (3.5)$$

where d is a pupil diameter of said human eye, u is said spatial frequency value, $\phi_0$ is a point spread function basic width, and $C_{ab}$ describes an increase of said point spread function basic width at an increasing pupil size.

32. The method of claim 28 wherein said rendering manager generates said original perceived contrast images that correspond to said original contrast images by utilizing said original contrast thresholds and said original contrast images.

33. The method of claim 32 wherein said rendering manager computes said original perceived contrast images by calculating individual pixel values $C_p$ according to an equation 3.6:

$$C_p = \sqrt{\frac{M_p}{m_t}} \quad (3.6)$$

where $M_p$ is an original pixel contrast value from said original contrast images, and $m_t$ is a corresponding one of said original contrast thresholds.

34. The method of claim 21 wherein said rendering manager performs said compression procedure upon said original perceived contrast images to thereby keep small pixel amplitudes relatively constant, and to thereby reduce large pixel amplitudes.

35. The method of claim 21 wherein said rendering manager calculates display contrast thresholds, mt, corresponding to an intended display device, for individual pixels corresponding to said original subbands according to an equation 3.3:

$$m_t = \frac{k}{M_{opt}(u)} \sqrt{\frac{2}{T}\left(\frac{1}{X_O^2} + \frac{1}{X_{MAX}^2} + \frac{u^2}{N_{MAX}^2}\right)\left(\frac{1}{\eta p E} + \frac{\phi_0}{1 - e^{-(u/u_0)^2}}\right)} \quad (3.3)$$

where u is a spatial frequency value for a pixel and surrounding pixels, $X_O$ is an object size for a displayed scene expressed in angular degrees for a human eye, $N_{max}$ is a maximum number of cycles that said human eye can integrate, $X_{max}$ is a maximum object size that said human eye can integrate, $\eta$ is a quantum efficiency of cones in said human eye, p is a photon conversion factor for converting light units, E is a retinal illuminance value for said displayed scene, $\phi_0$ is a spectral density of neural noise, $u_0$ is a lateral inhibition frequency limit, k is a signal-to-noise ratio of said displayed scene, $M_{opt}(u)$ is an optical modulation transfer function, and T is an integration time of said human eye.

36. The method of claim 35 wherein said rendering manager generates compressed contrast images, $M_p$, corresponding to said compressed perceived contrast images, $C_p$, by calculating individual pixel values according to a permutation of an equation 3.6:

$$C_p = \sqrt{\frac{M_p}{m_t}} \quad (3.6)$$

where $C_p$ is a pixel value from one of said compressed perceived contrast images, and $m_t$ is a corresponding one of said display contrast thresholds.

37. The method of claim 36 wherein said rendering manager generates compressed subband images corresponding to said compressed contrast values, $M_p$, by calculating individual pixel values $L_p$ according to a permutation of an equation 3.1:

$$M_p = \frac{L_p - L_A}{|L_A| + s} \quad (3.1)$$

where $M_p$ is a contrast value at a location p in one of said compressed contrast images, $L_A$ is a luminance average around said location p, and s is a saturation term to avoid divisions by zero.

38. The method of claim 37 wherein said rendering manager linearly rescales a lowest-frequency subband image from said original subband images such that a mean luminance value from said lowest-frequency subband image is equal to a mean output luminance of said intended display device.

39. The method of claim 38 wherein said rendering manager performs said subband combination procedure by initially adding a next-to-lowest compressed subband image to said lowest-frequency subband image to produce a current combined subband image, said rendering manager then continuing said subband combination procedure by sequentially adding each remaining one of said compressed subband images to said current combined subband image in an order of ascending subband frequencies to finally produce said rendered luminance image.

40. The method of claim 39 wherein said rendering manager combines said rendered luminance image with corresponding chrominance information to produce composite rendered image data for use by a system user.

41. A computer-readable medium comprising program instructions for performing a image rendering procedure by performing the steps of:
   dividing an original luminance image into a plurality of original subband images by utilizing a rendering manager;
   converting said original subband images into original perceived contrast images with said rendering manager;
   performing a compression procedure upon said original perceived contrast images to produce compressed perceived contrast images;
   converting said compressed perceived contrast images into compressed subband images with said rendering manager; and combining said compressed subband images together during a subband combination procedure to generate a rendered luminance image.

42. A system for performing an image rendering procedure, comprising:
- means for dividing an original luminance image into a plurality of original subband images;
- means for converting said original subband images into original perceived contrast images;
- means for performing a compression procedure upon said original perceived contrast images to produce compressed perceived contrast images;
- means for converting said compressed perceived contrast images into compressed subband images; and
- means for combining said compressed subband images together during a subband combination procedure to generate a rendered luminance image.

* * * * *